US00RE46177E

(19) United States
(12) Reissued Patent
Vermilion et al.

(10) Patent Number: US RE46,177 E
(45) Date of Reissued Patent: Oct. 11, 2016

(54) METHOD OF MANUFACTURING A SHINGLE WITH REINFORCED NAIL ZONE

(71) Applicant: Owens Corning Intellectual Capital, LLC, Toledo, OH (US)

(72) Inventors: Donn Vermilion, Newark, OH (US); Stephanie A. Rinne, Granville, OH (US); Michael S. Ugorek, New Albany, OH (US); John Scowden, Gahanna, OH (US); Barry M. Lewis, Newark, OH (US); D. Greg Hendershot, Columbus, OH (US); Russell L. Ault, Newark, OH (US); James S. Belt, Utica, OH (US)

(73) Assignee: Owens Corning Intellectual Capital, LLC, Toledo, OH (US)

(21) Appl. No.: 14/700,201

(22) Filed: Apr. 30, 2015

Related U.S. Patent Documents

Reissue of:
(64) Patent No.: 8,430,983
Issued: Apr. 30, 2013
Appl. No.: 13/193,868
Filed: Jul. 29, 2011

(51) Int. Cl.

| | |
|---|---|
| ***E04F 13/16*** | (2006.01) |
| ***B29C 65/52*** | (2006.01) |
| ***B32B 37/12*** | (2006.01) |
| ***B32B 37/20*** | (2006.01) |
| ***C09J 5/02*** | (2006.01) |

(Continued)

(52) U.S. Cl.
CPC ..... *E04D 1/26* (2013.01); *Y10T 156/1089* (2015.01)

(58) Field of Classification Search
None
See application file for complete search history.

(56) References Cited

U.S. PATENT DOCUMENTS

| | | | | |
|---|---|---|---|---|
| 1,597,135 | A | 8/1926 | Wittenberg | E04D 1/26 52/559 |
| 1,601,731 | A | 10/1926 | Flood | |
| 1,665,222 | A | 4/1928 | Robinson | |

(Continued)

FOREIGN PATENT DOCUMENTS

| | | |
|---|---|---|
| CA | 1207975 | 7/1986 |
| CN | 2176391 | 9/1994 |

(Continued)

OTHER PUBLICATIONS

*Fast Felt Corporation* v. *Owens Corning Roofing and Asphalt* (3:14 cv 803), 2014.*

(Continued)

*Primary Examiner* — Ling Xu
(74) *Attorney, Agent, or Firm* — Calfee, Halter & Griswold LLP

(57) ABSTRACT

A method of manufacturing a roofing shingle includes applying an asphalt coating to a substrate to define an asphalt coated sheet, the asphalt coated sheet including a headlap portion and a tab portion. Reinforcement material is applied [from a spool] to the asphalt coated sheet, wherein the reinforcement material is [wound in a waywind pattern on the spool] *payed out from a roll*. The reinforcement material is then secured to the headlap portion of the asphalt coated sheet. *Prior to applying the reinforcement material to the asphalt coated sheet, the reinforcement material has a first width. The method further includes shrinking the reinforcement material to a second width narrower than the first width upon securing the reinforcement material to the headlap portion.*

26 Claims, 6 Drawing Sheets

(51) Int. Cl.

| | |
|---|---|
| ***C08J 5/12*** | (2006.01) |
| ***E04D 1/26*** | (2006.01) |

(56) References Cited

U.S. PATENT DOCUMENTS

| | | | | |
|---|---|---|---|---|
| 1,701,926 | A | 2/1929 | Kirschbraun | |
| 1,799,500 | A | 4/1931 | Brophy | |
| 2,161,440 | A | 6/1939 | Venrick | |
| 2,798,006 | A | 7/1957 | Oldfield et al. | |
| 2,847,948 | A | 8/1958 | Truitt | |
| 3,252,257 | A | 5/1966 | Price et al. | |
| 3,377,762 | A | 4/1968 | Chalmers | |
| 3,468,086 | A | 9/1969 | Warner | |
| 3,468,092 | A | 9/1969 | Chalmers | |
| 3,624,975 | A | 12/1971 | Morgan et al. | |
| 3,664,081 | A | 5/1972 | Martin et al. | |
| 4,459,157 | A | 7/1984 | Koons | |
| 4,680,909 | A | 7/1987 | Stewart | |
| 4,706,435 | A | 11/1987 | Stewart | |
| 4,717,614 | A | 1/1988 | Bondoc et al. | |
| 4,755,545 | A | 7/1988 | Lalwani | |
| 4,817,358 | A | 4/1989 | Lincoln et al. | |
| 4,824,880 | A | 4/1989 | Algrim et al. | |
| 4,848,057 | A | 7/1989 | MacDonald et al. | E04D 1/26 52/518 |
| 5,181,361 | A | 1/1993 | Hannah et al. | |
| 5,209,802 | A | 5/1993 | Hannah et al. | |
| 5,239,802 | A | 8/1993 | Robinson | |
| 5,426,902 | A | 6/1995 | Stahl et al. | |
| 5,571,596 | A | 11/1996 | Johnson | B32B 5/28 428/143 |
| 5,577,361 | A | 11/1996 | Grabek, Jr. | |
| 5,660,014 | A | 8/1997 | Stahl et al. | |
| 5,822,943 | A | 10/1998 | Frankoski et al. | |
| 5,901,517 | A | 5/1999 | Stahl et al. | |
| 5,916,103 | A | 6/1999 | Roberts | E04D 1/26 52/105 |
| 5,950,387 | A | 9/1999 | Stahl et al. | |
| 6,010,589 | A | 1/2000 | Stahl et al. | |
| 6,021,611 | A | 2/2000 | Wells et al. | |
| 6,038,826 | A | 3/2000 | Stahl et al. | |
| 6,044,608 | A | 4/2000 | Stahl et al. | |
| 6,083,592 | A | 7/2000 | Chich | E04D 1/26 428/156 |
| 6,145,265 | A | 11/2000 | Malarkey et al. | |
| 6,148,578 | A | 11/2000 | Nowacek et al. | |
| 6,199,338 | B1 | 3/2001 | Hudson, Jr. et al. | |
| 6,220,329 | B1 | 4/2001 | King et al. | |
| 6,343,447 | B2 | 2/2002 | Geissels et al. | |
| 6,355,132 | B1 | 3/2002 | Becker et al. | |
| 6,397,546 | B1 | 6/2002 | Malarkey et al. | |
| 6,397,556 | B1 | 6/2002 | Karpinia | E04D 1/26 52/543 |
| 6,471,812 | B1 | 10/2002 | Thompson et al. | |
| 6,487,828 | B1 | 12/2002 | Phillips | |
| 6,502,779 | B1 * | 1/2003 | Jelinek et al. | D06H 5/00 242/413.5 |
| 6,523,316 | B2 | 2/2003 | Stahl et al. | |
| 6,610,147 | B2 | 8/2003 | Aschenbeck | |
| 6,652,909 | B2 | 11/2003 | Lassiter | |
| 6,679,020 | B2 | 1/2004 | Becker et al. | |
| 6,679,308 | B2 | 1/2004 | Becker et al. | |
| 6,708,456 | B2 | 3/2004 | Kiik et al. | |
| 6,709,994 | B2 | 3/2004 | Miller et al. | |
| 6,758,019 | B2 | 7/2004 | Kalkanoglu et al. | |
| 6,804,919 | B2 | 10/2004 | Railkar | |
| 6,823,637 | B2 | 11/2004 | Elliott et al. | E04D 1/26 52/314 |
| 6,990,779 | B2 | 1/2006 | Kiik et al. | |
| 7,082,724 | B2 | 8/2006 | Railkar et al. | |
| 7,118,794 | B2 | 10/2006 | Kalkanoglu et al. | |
| 7,666,498 | B2 * | 2/2010 | Collins | B41M 3/006 427/186 |
| 7,765,763 | B2 | 8/2010 | Teng et al. | |
| 7,781,046 | B2 | 8/2010 | Kalkanoglu et al. | |
| 7,836,654 | B2 * | 11/2010 | Belt | E04D 1/26 52/527 |
| 8,137,757 | B2 * | 3/2012 | Collins | B41M 3/006 427/428.06 |
| 2001/0049002 | A1 | 12/2001 | McCumber et al. | B32B 3/00 428/144 |
| 2003/0040241 | A1 | 2/2003 | Kiik et al. | |
| 2003/0093963 | A1 | 5/2003 | Stahl et al. | |
| 2004/0055240 | A1 | 3/2004 | Kiik et al. | A47G 27/0468 52/545 |
| 2004/0083673 | A1 | 5/2004 | Kalkanoglu et al. | |
| 2004/0083674 | A1 | 5/2004 | Kalkanoglu et al. | |
| 2004/0206035 | A1 | 10/2004 | Kandalgaonkar | |
| 2004/0258883 | A1 | 12/2004 | Weaver | |
| 2006/0032174 | A1 | 2/2006 | Floyd | |
| 2006/0179767 | A1 | 8/2006 | Miller et al. | |
| 2006/0265990 | A1 | 11/2006 | Kalkanoglu et al. | |
| 2008/0134612 | A1 | 6/2008 | Koschitzky | |
| 2010/0077689 | A1 | 4/2010 | Kalkanoglu et al. | |
| 2010/0143667 | A1 | 6/2010 | Collins et al. | |
| 2010/0310825 | A1 | 12/2010 | Kalkanoglu et al. | |

FOREIGN PATENT DOCUMENTS

| | | |
|---|---|---|
| JP | 50002937 | 1/1975 |
| WO | WO 2007019399 A1 * | 2/2007 |
| WO | 2007108846 | 9/2007 |
| WO | 2008052029 | 5/2008 |

OTHER PUBLICATIONS

Institution Decision, Inter Partes Review (IPR2015-00650) of U.S. Pat. No. 8,137,757, 2015.*

Chinese Office Action for Chinese Application 2006 80028893.4 dated Apr. 24, 2009.

International Search Report, PCT/US2006/030633 dated Nov. 28, 2006.

International Search Report, PCt/US2007/007827 dated Aug. 29, 2007.

US Office Action dated May 11, 2011, U.S. Appl. No. 12/895,195, filed Sep. 30, 2010.

US Office Action dated Mar. 2, 2011, U.S. Appl. No. 11/997,657, filed Nov. 5, 2008.

US Office Action dated Dec. 22, 2010, U.S. Appl. No. 12/895,195, filed Sep. 30, 2010.

US Office Action dated Mar. 18, 2010, U.S. Appl. No. 11/396,498.

US Office Action dated Mar. 4, 2010, U.S. Appl. No. 11/198,522, filed Aug. 5, 2005.

US Office Action dated Aug. 21, 2009, U.S. Appl. No. 11/396,498.

US Office Action dated Aug. 4, 2009, U.S. Appl. No. 11/198,522, filed Aug. 5, 2005.

US Office Action dated Sep. 30, 2008, U.S. Appl. No. 11/198,522, filed Aug. 5, 2005.

US Office Action dated Feb. 20, 2008, U.S. Appl. No. 11/198,522, filed Aug. 5, 2005.

US Office Action dated Oct. 31, 2007, U.S. Appl. No. 11/198,522, filed Aug. 5, 2005.

US Office Action dated Apr. 17, 2007, U.S. Appl. No. 11/198,522, filed Aug. 5, 2005.

US Notice of Allowance and Fee(s) Due, U.S. Appl. No. 12/895,195, filed Sep. 30, 2010.

Applicant's Submission dated Apr. 14, 2011 for U.S. Appl. No. 12/895,195.

Applicant's Submission dated Mar. 2, 2011 for U.S. Appl. No. 11/997,657.

Applicant's Submission dated Feb. 16, 2011 for U.S. Appl. No. 12/895,195.

Applicant's Submission dated Jan. 21, 2011 for U.S. Appl. No. 12/895,195.

Applicant's Submission dated Sep. 3, 2010 for U.S. Appl. No. 11/198,522.

Applicant's Submission dated Apr. 19, 2010 for U.S. Appl. No. 11/396,498.

Applicant's Submission dated Jan. 4, 2010 for U.S. Appl. No. 11/198,522.

(56) References Cited

OTHER PUBLICATIONS

Applicant's Submission dated Nov. 20, 2009 for U.S. Appl. No. 11/396,498.
Applicant's Submission dated Mar. 30, 2009 for U.S. Appl. No. 11/198,522.
Applicant's Submission dated Aug. 20, 2008 for U.S. Appl. No. 11/198,522.
Applicant's Submission dated Jan. 31, 2008 for U.S. Appl. No. 11/198,522.
Applicant's Submission dated Aug. 17, 2007 for U.S. Appl. No. 11/198,522.
Notification of Ground(s) for Rejection, Application No. JP2008-525265, Dated Dec. 12, 2011.
Notification of Ground(s) for Rejection Translation, Application No. JP2008-525265, Dated Dec. 12, 2011.

* cited by examiner

METHOD OF MANUFACTURING A SHINGLE WITH REINFORCED NAIL ZONE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED APPLICATION*

*This application is a reissue of U.S. Pat. No. 8,430,983, issued Apr. 30, 2013, titled METHOD OF MANUFACTURING A SHINGLE WITH REINFORCED NAIL ZONE, the entire disclosure of which is fully incorporated by reference herein.*

BACKGROUND

Asphalt-based roofing materials, such as roofing shingles, roll roofing, and commercial roofing, are installed on the roofs of buildings to provide protection from the elements, and to give the roof an aesthetically pleasing appearance. Typically, the roofing material is constructed of a substrate such as a glass fiber mat or an organic felt, an asphalt coating on the substrate, and a surface layer of granules embedded in the asphalt coating.

A common method for the manufacture of asphalt shingles is the production of a continuous sheet of asphalt material followed by a shingle cutting operation which cuts the material into individual shingles. In the production of asphalt sheet material, either a glass fiber mat or an organic felt mat is passed through a coater containing hot liquid asphalt filled with limestone to form a tacky, asphalt coated sheet. Subsequently, the hot asphalt coated sheet is passed beneath one or more granule applicators which discharge protective and decorative surface granules onto portions of the asphalt sheet material.

In certain types of shingles, it is especially desired that the shingles define a sufficiently wide area, often known in the industry as the "nail zone," in order to make installation of roofs using shingles, such as laminated shingles, more efficient and secure. One or more lines or other indicia painted or otherwise marked longitudinally on the surface of the shingle may define such a nail zone. It is especially desired that the shingles define a nail zone that guides installers in the placement of nails.

Additionally, shingles may experience lift in high wind situations. This lift may be exacerbated if the shingle tabs are not sealed or adhered to the shingle below. Therefore, there is also a need for shingles that have a sufficiently high nail pull-through value so that the installed shingles have improved performance in high wind situations.

SUMMARY OF THE INVENTION

The present application describes various embodiments of a method of manufacturing a roofing shingle. One embodiment of the method of manufacturing a roofing shingle includes applying an asphalt coating to a substrate to define an asphalt coated sheet, the asphalt coated sheet including a headlap portion and a tab portion. Reinforcement material is applied [from a spool] to the asphalt coated sheet, wherein the reinforcement material is [wound in a waywind pattern on the spool] *payed out from a roll*. The reinforcement material is then secured to the headlap portion of the asphalt coated sheet. *Prior to applying the reinforcement material to the asphalt coated sheet, the reinforcement material has a first width. The method further includes shrinking the reinforcement material to a second width narrower than the first width upon securing the reinforcement material to the headlap portion.*

In another embodiment, the method of manufacturing a roofing shingle includes applying an asphalt coating to a substrate to define an overlay sheet having a headlap portion and a tab portion. An underlay sheet is secured to the overlay sheet such that a region of the underlay sheet overlaps a region of the headlap portion of the overlay sheet. Reinforcement material is applied [from a spool] to the overlay sheet, wherein the reinforcement material is [wound in a waywind pattern on the spool] *payed out from a roll*. The reinforcement material is then secured to the headlap portion of the overlay sheet. *Prior to applying the reinforcement material to the asphalt coated sheet, the reinforcement material has a first width. The method further includes shrinking the reinforcement material to a second width narrower than the first width upon securing the reinforcement material to the headlap portion.*

In a further embodiment, the method of manufacturing a roofing shingle includes applying an asphalt coating to a substrate to define an asphalt coated sheet, the asphalt coated sheet including a headlap portion and a tab portion. Reinforcement material is applied [from a spool] to the asphalt coated sheet, wherein the reinforcement material is [wound in a waywind pattern on the spool] *payed out from a roll*. The reinforcement material is then secured to the headlap portion of the asphalt coated sheet. [The] *Prior to applying the reinforcement material to the asphalt coated sheet, the* reinforcement material on the spool has a first width, the method further including shrinking the reinforcement material to a second width narrower than the first width upon securing the reinforcement material to the headlap portion.

Other advantages of the method of manufacturing a roofing shingle will become apparent to those skilled in the art from the following detailed description, when read in light of the accompanying drawings.

DETAILED DESCRIPTION

Figure 1:
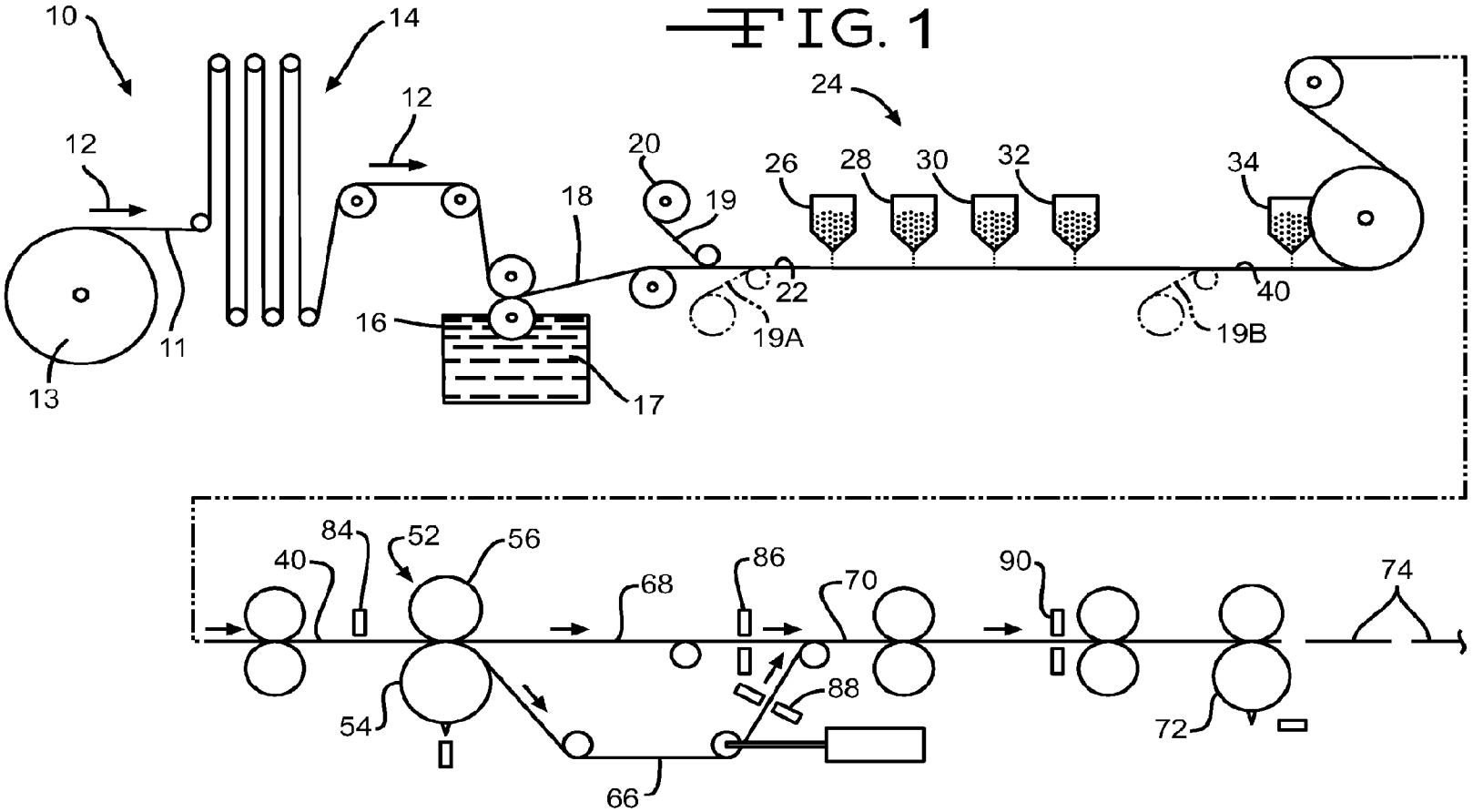
FIG. 1 is a schematic elevational view of an apparatus for manufacturing shingles according to the invention.

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description of the invention and the appended claims, the term "asphalt coating" is defined as any type of bituminous material suitable for use on a roofing material, such as asphalts, tars, pitches, or mixtures thereof. The asphalt may be either manufactured asphalt produced by refining petroleum or naturally occurring asphalt. The asphalt coating may include various additives and/or modifiers, such as inorganic fillers, mineral stabilizers, non-polymers, and organic materials such as polymers, recycled streams, or ground tire rubber. Preferably, the asphalt coating is a filled-asphalt that contains asphalt and an inorganic filler or mineral stabilizer.

As used in the description of the invention and the appended claims, the term "longitudinal" or "longitudinally" is defined as substantially parallel with the machine direction.

As used in the description of the invention and the appended claims, the terms "shingle blow off" or "blow off" are defined as the occurrence of installed shingles being forced off a roof deck when the installed shingles are subjected to high winds. Also, the term "shingle blow through" or "blow through" are defined as the situation that occurs when a nail has been driven too deeply into the shingle and the nail head penetrates through at least the shingle overlay.

As used in the description of the invention and the appended claims, the term "wet" or "wet out" is defined as the ability of sealant or adhesive to flow and/or reflow over a surface to maximize bond strength based on a larger contact area.

As used in the description of the invention and the appended claims, the term "waywind" is defined as fibers, or strips of material or fabric that are collected, applied to, or wound on a spool or bobbin in a pattern that changes the angle of the material relative to the longitudinal axis of the spool.

Composite shingles, such as asphalt shingles, are a commonly used roofing product. Asphalt shingle production generally includes feeding a base material from an upstream roll and coating it first with a roofing asphalt material, then a layer of granules. The base material is typically made from a fiberglass mat provided in a continuous shingle membrane or sheet. It should be understood that the base material may be any suitable support material.

Composite shingles may have a headlap region and a prime region. The headlap region may be ultimately covered by adjacent shingles when installed upon a roof. The prime region will be ultimately visible when the shingles are installed upon a roof.

The granules deposited on the composite material shield the roofing asphalt material from direct sunlight, offer resistance to fire, and provide texture and color to the shingle. The granules generally involve at least two different types of granules. Headlap granules are applied to the headlap region. Headlap granules are relatively low in cost and primarily serve the functional purposes of covering the underlying asphalt material for a consistent shingle construction, balancing sheet weight, and preventing overlapping shingles from sticking to one another. Colored granules or other prime granules are relatively expensive and are applied to the shingle at the prime regions. Prime granules are disposed upon the asphalt strip for both the functional purpose of protecting the underlying asphalt strip and for providing an aesthetically pleasing appearance of the roof.

The performance of an installed shingle, such as in high wind conditions, may be enhanced by reinforcing the nail zone of the shingle. By reinforcing the nail zone, the occurrence of nail blow through during shingle installation may be reduced. Reducing the occurrence of nail blow through advantageously reduces the possibility of a roof leak if water travels under the shingle tab. A reinforced nail zone also improves the efficiency of the shingle installer by reducing the likelihood of nail blow through when the shingle is weakened due to high temperatures, such as when the roof or shingle temperature is above about 120 degrees F., or when nail gun air pressure is too high. The reinforced nail zone may also provide a defined and relatively wide area in which the installer may nail. Advantageously, the reinforced nail zone will increase the force required to pull a nail through the shingle, thereby reducing the likelihood of shingle blow off.

The nail zone may also be used as the bonding substrate area or bonding surface for tab sealant bonded to the underside of the tabs of the overlay sheet. The nail zone may provide an improved bonding surface for tab sealant.

It is known that most debonding energy, such as is generated between the tab sealant and the bonding surface is due to viscoelastic loss in the tab sealant as it is stretched during debonding. Further, the polymer modified asphalt sealants typically used as tab sealants on shingles may lose their viscoelastic characteristics when the temperature drops to 40 degrees F. or below.

Advantageously, the use of woven or non-woven fabric to reinforce the nail zone and to define the bonding surface for tab sealant has been shown to improve or retain debonding loads of polymer modified asphalt sealants relative to shingles without a reinforced nail zone at relatively low temperatures, such as temperatures below about 40 degrees F. This relatively strong debonding load between woven or non-woven fabric and modified asphalt sealants, including polymer and non-polymer modified asphalt tab sealants, occurs because the woven or non-woven fabric mechanically bonds to the sealant. For example, mechanical attachment occurs as the polymer modified asphalt sealant flows around individual filaments and fiber bundles within the woven or non-woven fabric during bonding. The energy required to debond the polymer modified asphalt sealant from the woven or non-woven fabric is increased or comparable to the energy required to debond the polymer modified asphalt sealant from a shingle without a reinforced nail zone. Because the tab sealant is reinforced with the filaments and fiber bundles within the woven or non-woven fabric at the interface between the polymer modified asphalt sealant and the woven or non-woven fabric, the interior of the sealant becomes the weakest portion of the bond.

An additional advantage of using woven or non-woven fabric to reinforce the nail zone is that the fabric may be installed during shingle production. During shingle production, the woven or non-woven fabric may be pushed into the hot, filled-asphalt coating, such that some of the filled-asphalt bleeds up and around the individual fibers and fiber bundles of the fabric. This creates a positive mechanical bond between the fabric and the shingle substrate. Further, the filled-asphalt that bleeds up and into the fabric aids in forming a bond between the tab sealant and the shingle because the filled-asphalt diffuses into the tab sealant. When installed on a roof, this creates a robust continuous path for the transfer of debonding loads from the tab above to the nail in the shingle below.

Referring now to the drawings, there is shown in FIG. 1 an apparatus 10 for manufacturing an asphalt-based roofing material according to the invention. The illustrated manufacturing process involves passing a continuous sheet of substrate or shingle mat 11 in a machine direction 12 through a series of manufacturing operations. The mat 11 usually moves at a speed of at least about 200 feet/minute (61 meters/minute), and typically at a speed within the range of between about 450 feet/minute (137 meters/minute) and about 800 feet/minute (244 meters/minute). The sheet, however, may move at any desired speed.

In a first step of the manufacturing process, the continuous sheet of shingle mat 11 is payed out from a roll 13. The shingle mat 11 may be any type known for use in reinforcing asphalt-based roofing materials, such as a nonwoven web of glass fibers. Alternatively, the substrate may be a scrim or felt of fibrous materials such as mineral fibers, cellulose fibers, rag fibers, mixtures of mineral and synthetic fibers, or the like.

The sheet of shingle mat 11 is passed from the roll 13 through an accumulator 14. The accumulator 14 allows time for splicing one roll 13 of substrate to another, during which time the shingle mat 11 within the accumulator 14 is fed to the manufacturing process so that the splicing does not interrupt manufacturing.

Next, the shingle mat 11 is passed through a coater 16 where a coating of asphalt 17 is applied to the shingle mat 11 to form a first asphalt-coated sheet 18. The asphalt coating 17 may be applied in any suitable manner. In the illustrated embodiment, the shingle mat 11 contacts a supply of hot, melted asphalt 17 to completely cover the shingle mat 11 with a tacky coating of asphalt 17. However, in other embodiments, the asphalt coating 17 could be sprayed on, rolled on, or applied to the shingle mat 11 by other means. Typically, the asphalt coating is highly filled with a ground mineral filler material, amounting to at least about 60 percent by weight of the asphalt/filler combination. In one embodiment, the asphalt coating 17 is in a range from about 350° F. to about 400° F. In another embodiment, the asphalt coating 17 may be more than 400° F. or less than 350° F. The shingle mat 11 exits the coater 16 as a first asphalt-coated sheet 18. The asphalt coating 17 on the first asphalt-coated sheet 18 remains hot.

A continuous strip of a reinforcement material 19, as will be described in detail herein, may then be payed out from a roll 20. The reinforcement material 19 adheres to the first asphalt-coated sheet 18 to define a second asphalt-coated sheet 22. In a first embodiment, the reinforcement material 19 is attached to the sheet 18 by the adhesive mixture of the asphalt in the first asphalt-coated sheet 18. The reinforcement material 19, however, may be attached to the sheet 18 by any suitable means, such as other adhesives. As described in detail below, the material 19 may be formed from any material for reinforcing and strengthening the nail zone of a shingle, such as, for example, paper, film, scrim material, and woven or non-woven glass fibers.

The resulting second asphalt coated sheet 22 may then be passed beneath a series of granule dispensers 24 for the application of granules to the upper surface of the second asphalt-coated sheet 22. The granule dispensers may be of any type suitable for depositing granules onto the asphalt-coated sheet. A granule dispenser that may be used is a granule valve of the type disclosed in U.S. Pat. No. 6,610,147 to Aschenbeck. The initial granule blender 26 may deposit partial blend drops of background granules of a first color blend on the tab portion of the second asphalt coated sheet 22 in a pattern that sets or establishes the trailing edge of subsequent blend drops of a second color blend (of an accent color) and a third color blend (of a different accent color). For purposes of this patent application, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult.

As is well known in the art, blend drops applied to the asphalt-coated sheet are often made up of granules of several different colors. For example, one particular blend drop that is supposed to simulate a weathered wood appearance might actually consist of some brown granules, some dark gray granules, and some light gray granules. When these granules are mixed together and applied to the sheet in a generally uniformly mixed manner, the overall appearance of weathered wood is achieved. For this reason, the blend drops are referred to as having a color blend, which gives an overall color appearance. This overall appearance may be different from any of the actual colors of the granules in the color blend. In addition, blend drops of darker and lighter shades of the same color, such as, for example, dark gray and light gray, are referred to as different color blends rather than merely different shades of one color.

As shown in FIG. 1, the series of dispensers 24 includes four color-blend blenders 26, 28, 30, and 32. Any desired number of blenders, however, may be used. The final blender may be the background blender 34. Each of the blenders may be supplied with granules from sources of granules, not shown. After the blend drops are deposited on the second asphalt-coated sheet 22, the remaining, uncovered areas are still tacky with warm, uncovered asphalt, and the background granules from the background blender 34 will adhere to the areas that are not already covered with blend drop granules. After all the granules are deposited on the second asphalt-coated sheet 22 by the series of dispensers 24, the sheet 22 becomes a granule-covered sheet 40.

In the illustrated embodiment, the reinforcement material 19 includes an upper surface to which granules substantially will not adhere. Granules may therefore be deposited onto substantially the entire second asphalt-coated sheet 22, including the material 19, but wherein the reinforcement material 19 includes an upper surface to which granules substantially will not adhere.

The granule-covered sheet 40 may then be turned around a slate drum 44 to press the granules into the asphalt coating and to temporarily invert the sheet so that the excess granules will fall off and will be recovered and reused. Typically, the granules applied by the background blender 34 are made up by collecting the backfall granules falling from the slate drum 44.

The granule-covered sheet 40 may subsequently be fed through a rotary pattern cutter 52, which includes a bladed cutting cylinder 54 and a backup roll 56, as shown in FIG. 1. If desired, the pattern cutter 52 may cut a series of cutouts in the tab portion of the granule-covered sheet 40, and cut a series of notches in the underlay portion of the granule-covered sheet 40.

The pattern cutter 52 may also cut the granule-covered sheet 40 into a continuous underlay sheet 66 and a continuous overlay sheet 68. The underlay sheet 66 may be directed to be aligned beneath the overlay sheet 68, and the two sheets may be laminated together to form a continuous laminated sheet 70. As shown in FIG. 1, the continuous underlay sheet 66 may be routed on a longer path than the path of the continuous overlay sheet 68. Further downstream, the continuous laminated sheet 70 may be passed into contact with a rotary length cutter 72 that cuts the laminated sheet into individual laminated shingles 74.

In order to facilitate synchronization of the cutting and laminating steps, various sensors and controls may be employed. For example, sensors, such as photo eyes 86 and 88 may be used to synchronize the continuous underlay sheet 66 with the continuous overlay sheet 68. Sensors 90 may also be used to synchronize the notches and cutouts of the continuous laminated sheet with the end cutter or length cutter 72.

In a second embodiment, the reinforcement material may be attached to a lower surface (the downwardly facing surface when viewing FIG. 1) of the mat 11, the first asphalt coated sheet 18, the second asphalt coated sheet 22, or the granule-covered sheet 40, as shown at 19A and 19B in FIG. 1. The reinforcement material 19A and 19B may be attached to the mat 11, the first asphalt coated sheet 18, the second asphalt coated sheet 22, or the granule-covered sheet 40 by any suitable means, such as hot, melted asphalt, other adhesives, or suitable fasteners. In such an embodiment, the reinforcement material 19A and 19B may be attached to the lower surface of the nail zone of either of the overlay sheet 68 or the underlay sheet 66, thereby reinforcing and strengthening the nail zone as described herein.

Figure 2:
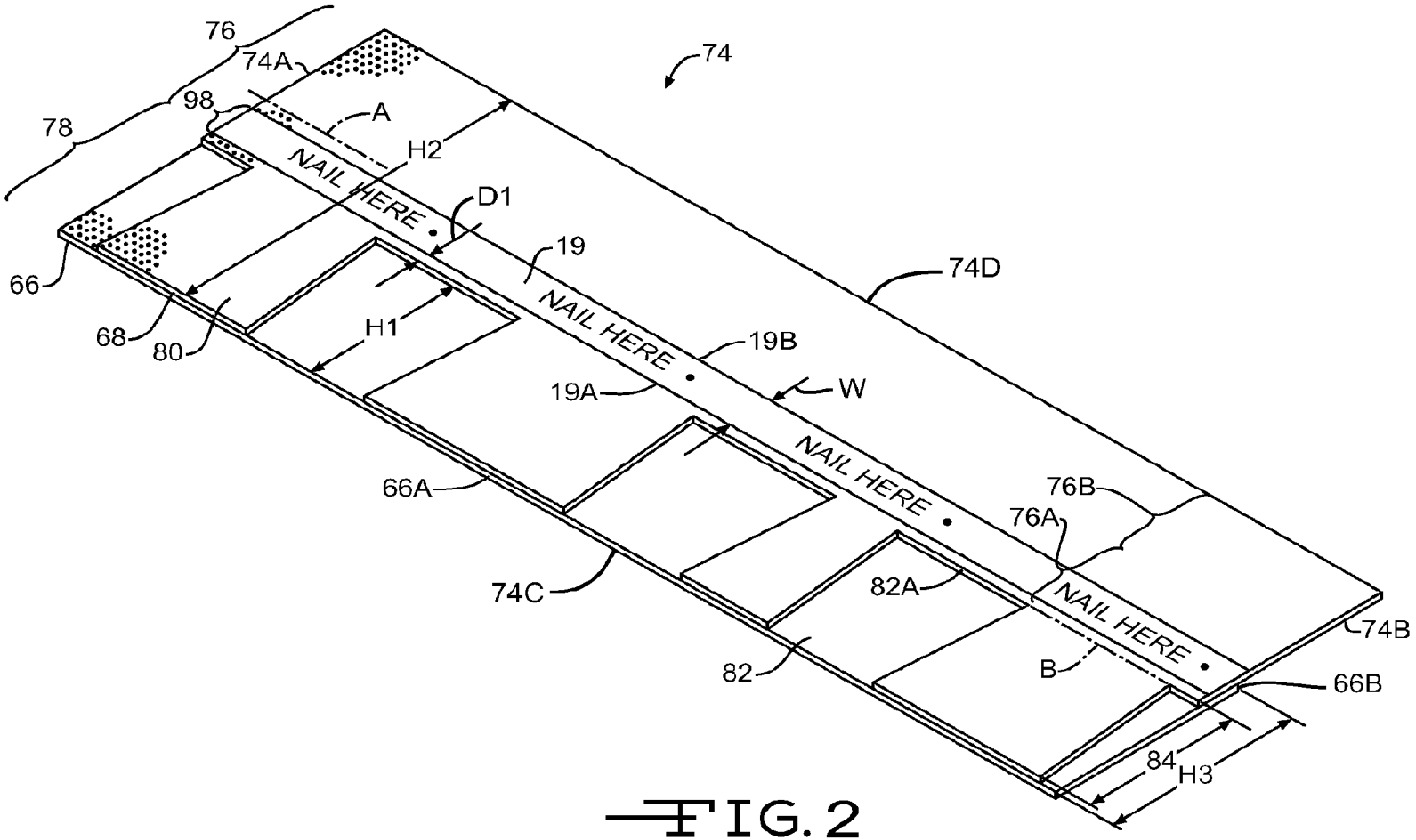
FIG. 2 is a perspective view of a first embodiment of a laminated shingle having reinforcement material in accordance with the invention.
Figure 3:
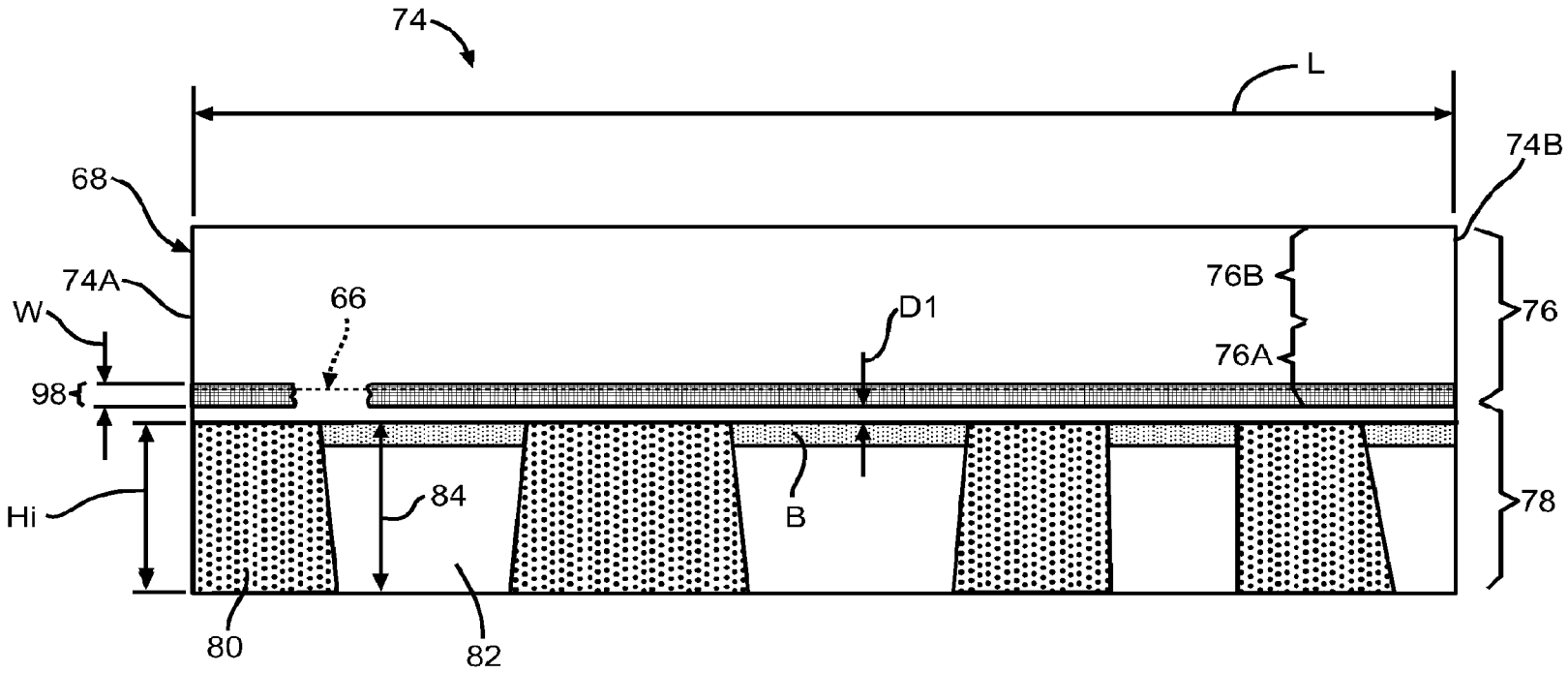
FIG. 3 is a plan view of the front of the laminated shingle illustrated in FIG. 2.
Figure 4:
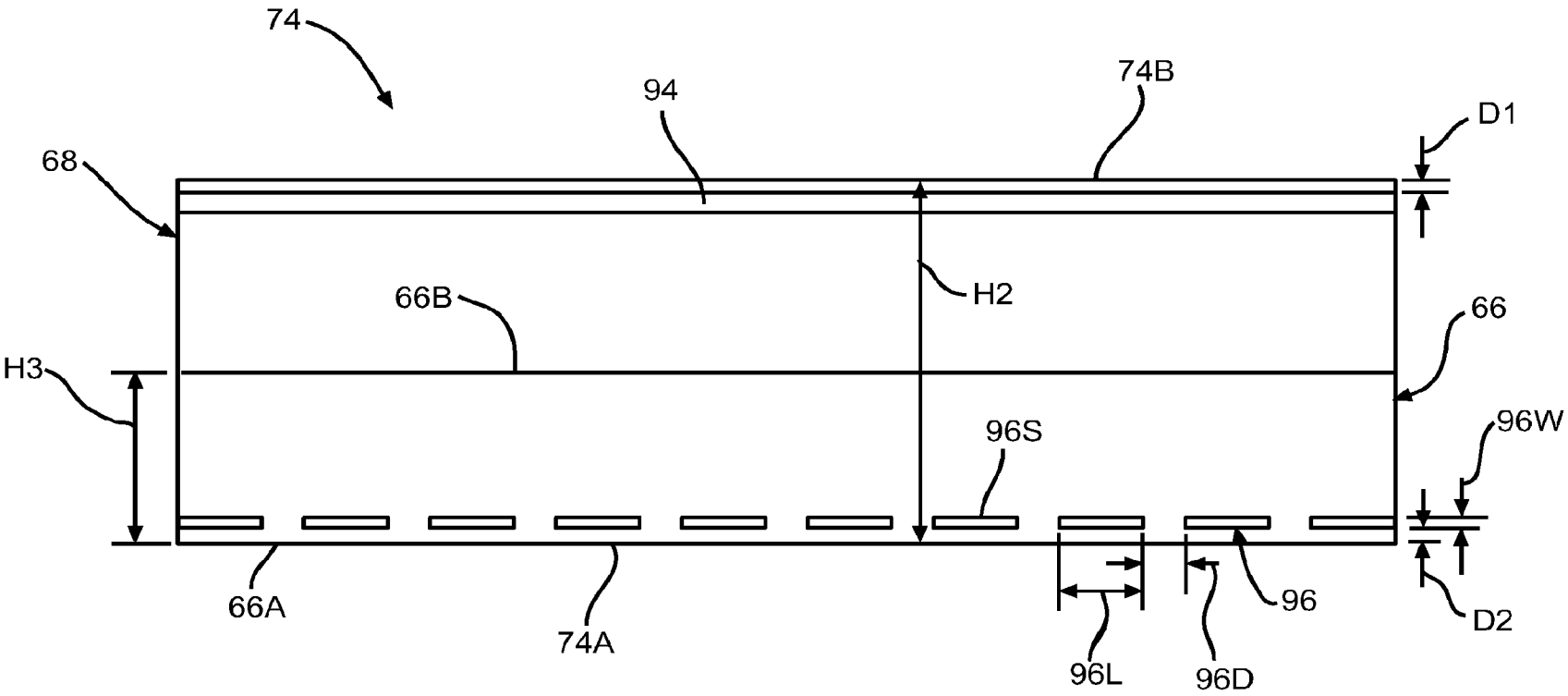
FIG. 4 is a plan view of the back of the laminated shingle illustrated in FIGS. 2 and 3.

Referring now to FIGS. 2, 3, and 4, a first embodiment of a laminated roofing shingle is shown generally at 74. In the illustrated embodiment, the shingle 74 has a length L and includes the overlay sheet 68 attached to the underlay sheet 66 and has a first end or leading edge 74C and a second end or trailing edge 74D. In the illustrated embodiment, the laminated roofing shingle 74 has a length L of about 39.375 inches. Alternatively, the length L may be within the range of from about 39.125 inches to about 39.625 inches. The shingle 74 may also be manufactured having any other desired length. The shingle 74 also includes a longitudinal axis A. The overlay sheet 68 may include a headlap portion 76 and a tab portion 78. The headlap portion 76 may include a lower zone 76A and an upper zone 76B. The tab portion 78 defines a plurality of tabs 80 and cutouts 82 between adjacent tabs 80.

In the illustrated embodiment, the tab portion 78 includes four tabs 80, although any suitable number of tabs 80 may be provided. The headlap portion 76 and the tabs 80 may include one or more granule patterns thereon. Each cutout 82 has a first height H1. In the illustrated embodiment, the cutout 82 has a first height H1 of about 5.625 inches. Alternatively, the first height H1 may be within the range of from about 5.5 inches to about 5.75 inches. In the illustrated embodiment, the cutouts 82 are shown as having the same height H1. It will be understood however, that each cutout 82 may be of different heights. A line B is collinear with an upper edge 82A of the cutouts 82 and defines an upper limit of an exposed region 84 of the underlay sheet 66. In the illustrated embodiment, the height of the exposed region 84 is equal to the first height H1, although the height of the exposed region 84 may be any desired height. In a shingle wherein the cutouts 82 have different heights, the line B may be collinear with an upper edge 82A of the cutout 82 having the largest height. In the illustrated embodiment, the overlay sheet 68 has a second height H2.

The reinforcement material 19 has a width W of about 1.0 inch. Alternatively, the width W may be within the range of from about 0.75 inch to about 1.5 inches. Additionally, the width W may be within the range of from about 0.5 inch to about 2.0 inches. The reinforcement material 19 may be disposed longitudinally on the headlap portion 76. In the illustrated embodiment, the reinforcement material 19 extends longitudinally from the first end 74A to the second end 74B of the shingle 74 within the lower zone 76A of the headlap portion 76. A lower edge 19A of the reinforcement material 19 may be spaced apart from the line B by a distance D1. In the illustrated embodiment, the distance D1 is about 0.25 inch. Alternatively, the distance D1 may be within the range of from about 0.125 inch to about 0.375 inch. The distance D1 may however, be of any other desired length. For example, if desired, the reinforcement material 19 may substantially cover the entire headlap portion 76 of the overlay sheet 68. It will be understood that the reinforcement material 19 need not extend from the first end 74A to the second end 74B of the shingle 74, and may be disposed in one or more sections or portions on the shingle 74.

The reinforcement material 19 defines a reinforced nail zone 98 and may include text such as "NAIL HERE ●", as shown in FIG. 2. It will be understood, however, that any other text or other indicia may be included on the reinforcement material 19. It will also be understood that the reinforcement material 19 can be provided without such text or indicia. These indicia on the reinforcement material 19 ensure that the reinforced nail zone 98 may be easily and quickly identified by the shingle installer.

In the embodiment illustrated in FIGS. 2 and 4, the underlay sheet 66 includes a leading edge 66A and a trailing edge 66B and has a third height H3. In the illustrated embodiment, the height H3 of the underlay sheet 66 is about 6.625 inches. Alternatively, the height H3 may be within the range of from about 6.5 inches to about 6.75 inches. The underlay sheet 66 may also be manufactured having any other desired height.

In the illustrated embodiment, the third height H3 of the underlay sheet 66 is equal to about one-half the second height H2 of the overlay sheet 68. The overlay sheet 68 and the underlay sheet 66 thereby overlap to define a two-layer portion of the laminated shingle 74 and a single-layer portion of the laminated shingle 74. More specifically, a region of the underlay sheet 66 overlaps a region of the headlap portion 76 of the overlay sheet 68, thereby defining a two-layer portion and a single-layer portion of the laminated shingle 74 within the headlap portion 76. At least a portion of the reinforcement material 19 is adhered to the single-layer portion of the laminated shingle 74. Alternately, the third height H3 of the underlay sheet 66 may be greater than one-half of the second height H2 of the overlay sheet 68. This relationship between the underlay sheet 66 and the overlay sheet 68 allows the reinforcement material 19 to be positioned such that a reinforced nail zone is provided at the two-layer portion of the laminated shingle 74.

Referring now to FIG. 4, a back side of the laminated shingle 74 is shown. If desired, a continuous strip of release tape 94 may extend longitudinally and may be adhered to an upper surface of the back side of the laminated shingle 74 adjacent and parallel to a trailing edge 74D of the laminated shingle 74. The release tape 94 is positioned such that it will be opposite the tab sealant 96 when the laminated shingles 74 are stacked, such as when packaged for shipment. The release tape 94 may be spaced a distance D1 from the trailing edge 74D of the laminated shingle 74. In the illustrated embodiment, the release tape 94 is spaced about 0.125 inches from the trailing edge 74D of the laminated shingle 74. Alternatively, the release tape 94 may be placed at any desired location on the back side of the laminated shingle 74, such that the release tape 94 contacts and covers the sealant 96 when a plurality of the laminated shingles 74 are stacked in a bundle, such as for shipping.

A discontinuous bead of tab sealant 96 may extend longitudinally and may be adhered to a lower surface of the back side of the laminated shingle 74 adjacent and parallel to a leading edge 74C of the laminated shingle 74. The tab sealant 96 may be spaced a distance D2 from the leading edge 74C of the laminated shingle 74. In the illustrated embodiment, the tab sealant 96 is spaced about 0.5 inches from the leading edge 74C of the laminated shingle 74. Alternatively, the tab sealant 96 may be spaced within the range of from about 0.375 inch to about 0.625 inch from the leading edge 74C of the laminated shingle 74. In the illustrated embodiment, the tab sealant 96 includes segments 96S having a length 96L of about 3.0 inches. Alternatively, the tab sealant segments 96S may have a length 96L within the range of from about 2.25 inches to about 4.25 inches. The tab sealant segments 96S may be spaced apart a distance 96D. In the illustrated embodiment, the tab sealant segments 96S are spaced about 1.0 inch apart. Alternatively, the tab sealant segments 96S may be spaced within the range of from about 0.25 inch to about 1.5 inches apart.

The tab sealant segments 96S may have a width 96W. In the illustrated embodiment, the tab sealant segments 96S have a width 96W of about 0.5 inch. Alternatively, the tab sealant segments 96S may have a width 96W within the range of from about 0.375 inches to about 0.675 inches. The tab sealant segments 96S may also be applied having any other desired width. In the illustrated embodiment, the tab sealant segments 96S have a thickness of about 0.035 inch. Alternatively, the tab sealant segments 96S may have a thickness within the range of from about 0.028 inches to about 0.050 inches. The tab sealant segments 96S may also be applied having any other desired thickness. It will be understood that the bead of tab sealant 96 may be applied as a continuous bead of sealant.

In the illustrated embodiment, wherein the reinforcement material 19 has a width W of about 1.0 inch, the reinforcement material 19 is positioned such that about 75 percent (0.75 inch) of the reinforced nail zone is positioned over the two-layer portion of the laminated shingle 74, and about 25 percent (0.25 inch) of the reinforced nail zone is positioned over the single-layer portion of the laminated shingle 74. Alternatively, within the range of from about 62.5 percent (0.625 inch) to about 87.5 percent (0.875) of the reinforced nail zone is positioned over the two-layer portion of the laminated shingle 74, and within the range of from about 12.5 percent (0.125 inch) to about 37.5 percent (0.375 inch) of the reinforced nail zone is positioned over the single-layer portion of the laminated shingle 74.

Figure 5:
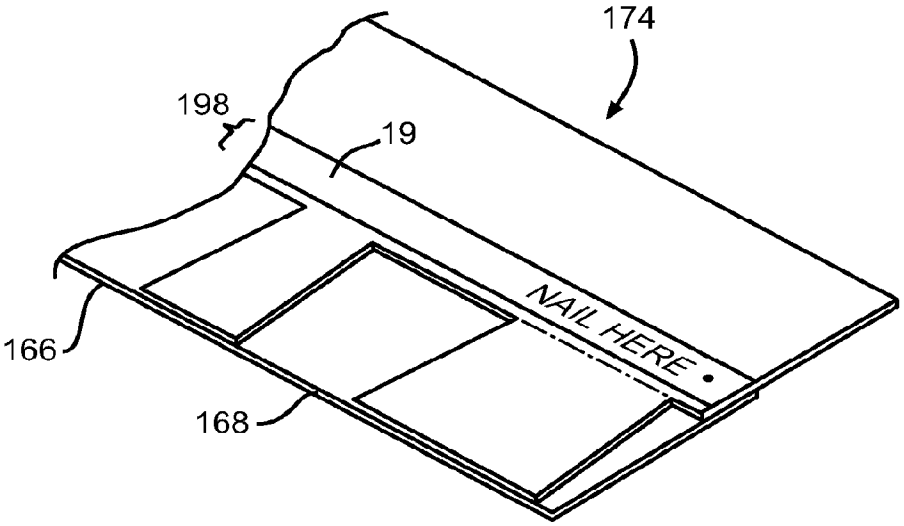
FIG. 5 is a perspective view of a portion of a second embodiment of a laminated shingle having reinforcement material in accordance with the invention.

Additionally, within the range of from about 50 percent (0.50 inch) to about 100 percent (1.0 inch) of the reinforced nail zone is positioned over the two-layer portion of the laminated shingle 74, and within the range of from about 0.0 percent (0.0 inch) to about 50 percent (0.50 inch) of the reinforced nail zone is positioned over the single-layer portion of the laminated shingle 74. For example, a second embodiment of the laminated shingle 174 is shown in FIG. 5, and includes the underlay sheet 166 and the overlay sheet 168. The reinforcement material 19 is attached to the overlay sheet 168 as described above and is positioned such that about 100 percent of the reinforced nail zone 198 is positioned over the two-layer portion of the laminated shingle 174, and about 0 percent of the reinforced nail zone 198 is positioned over the single-layer portion of the laminated shingle 174.

Figure 6:
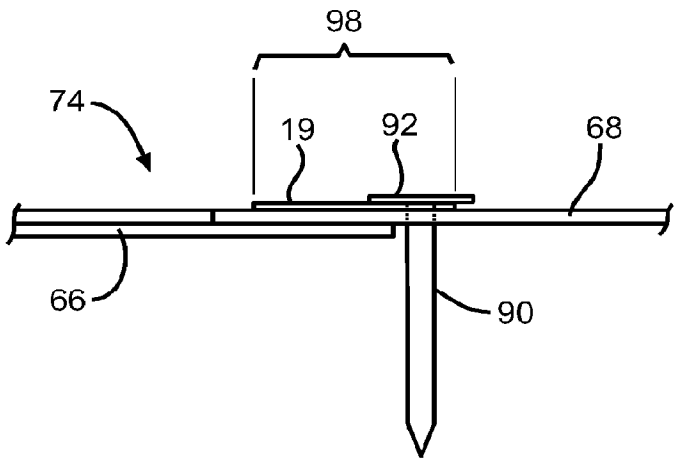
FIG. 6 is an enlarged schematic elevational view of a portion of the laminated shingle illustrated in FIGS. 2, 3, and 4.

An enlarged schematic view of a portion of the laminated shingle 74 is shown in FIG. 6. As shown, the reinforcement material 19 of the reinforced nail zone 98 is shown with a nail 90 installed through the reinforcement material 19 where it is adhered to the single-layer portion of the laminated shingle 74. The nail 90 extends only through the reinforcement material 19 and the overlay sheet 68, but a portion of the nail head 92 (left most portion of the nail head 92 when viewing FIG. 6) extends over the two-layer portion of the laminated shingle 74. Advantageously, the position of the reinforcement material 19 relative to the two-layer portion of the laminated shingle 74 significantly reduces the occurrence of shingle blow through and significantly increases nail pull through resistance during installation and wind uplift events such as occurs during high winds. Even if an installer drives a nail 90 through the upper most portion of the reinforcement material 19 (right most portion of reinforcement material 19 when viewing FIG. 6), as shown in FIG. 6, at least a portion of the nail head 92 will extend over and engage the two-layer portion of the laminated shingle 74, and thus be substantially prevented from blowing through the laminated shingle 74.

The embodiment of the reinforcement material 19 illustrated in FIGS. 2 and 3 is a woven material or web woven from polyester fabric yarns of about 150 denier. Alternatively, the reinforcement material 19 may be a material woven from fabric yarns within the range of from about 125 denier to about 175 denier. Additionally, the reinforcement material 19 may be a material woven from fabric yarns within the range of from about 100 denier to about 200 denier.

The embodiment of the woven reinforcement material 19 illustrated in FIGS. 2 and 3 is a 150 denier material having a density of about 80 yarns per inch in the warp or machine direction and about 45 yarns per inch in the cross-machine direction. Alternatively, the reinforcement material 19 may be a woven material having a density within the range of from about 65 yarns per inch to about 90 yarns per inch in the warp direction and within the range of from about 35 yarns per inch to about 55 yarns per inch in the cross-machine direction. It has been shown that 150 denier woven polyester material having a density within the range of from about 90 yarns per inch to about 100 yarns per inch in the warp direction and 60 yarns per inch or greater in the cross-machine direction do not satisfactorily adhere to the adhesive mixture of the asphalt in the first asphalt coated sheet 18.

The embodiment of the woven reinforcement material 19 illustrated in FIGS. 2 and 3 may have a weight of about 2.8 ounces/yard$^2$. Alternatively, the reinforcement material 19 may be a woven material having a weight within the range of from about 2.0 ounces/yard$^2$ to about 3.5 ounces/yard$^2$. Additionally, the reinforcement material 19 may be a woven material having a weight within the range of from about 1.5 ounces/yard$^2$ to about 4.5 ounces/yard.

The embodiment of the woven reinforcement material 19 illustrated in FIGS. 2 and 3 may also have a thickness of about 9.5 mils. Alternatively, the reinforcement material 19 may be a woven material having a thickness within the range of from about 5 mils to about 15 mils. Additionally, the reinforcement material 19 may be a woven material having a thickness within the range of from about 3 mils to about 20 mils. The reinforcement material 19 may also have having any other desired thickness.

The embodiment of the woven reinforcement material 19 illustrated in FIGS. 2 and 3 may further have an air permeability of about 210 cm$^3$/s/cm$^2$, measured, for example, in accordance with ASTM D737. Alternatively, the reinforcement material 19 may be a woven material having an air permeability within the range of from about 160 cm$^3$/s/cm$^2$ to about 260 cm$^3$/s/cm$^2$. Additionally, the reinforcement material 19 may be a woven material having an air permeability within the range of from about 85 cm$^3$/S/cm$^2$ to about 335 cm$^3$/s/cm$^2$.

The embodiment of the woven reinforcement material 19 illustrated in FIGS. 2 and 3 is formed from polyester fiber. Alternatively, the woven reinforcement material 19 may be formed from any other suitable material, such as nylon, KEVLAR®, cotton, rayon, and fiberglass. It will be understood that the properties and characteristics, such as weight, density, and air permeability, of the polyester reinforcement material 19 described above will vary when the reinforcement material 19 is formed from materials other than polyester fiber. Further, polypropylene may be used to form the woven reinforcement material 19 if either the reinforcement material 19 and/or the first asphalt-coated sheet 18 are cooled so that the reinforcement material 19 does not melt or shrink when it contacts the first asphalt-coated sheet. It will be understood that the embodiments of the woven reinforcement material described herein may have any desired weave pattern.

It will be understood that the reinforcement material 19 may be formed as a non-woven mat. In a first embodiment of a non-woven mat, the non-woven mat may comprise about 10 percent glass fiber and about 90 percent bi-component polymer fiber, or a glass to bi-component fiber ratio of 10:90. One example of a suitable bi-component fiber is a fiber having a polyethylene (PE) outer sheath and a polyethylene terephthalate (PET) core, wherein the bi-component fibers have a 50:50 by weight sheath to core ratio. It has been shown that the glass fiber in the reinforcement material 19 helps to ensure dimensional stability of the reinforcement material 19 when it is cured and when it is applied to a shingle.

It will be understood that non-woven mats having glass to bi-component fiber ratios other than 10:90 may also meet or exceed the desired bond strengths over a range of temperatures. For example, non-woven mats having glass to bi-component fiber ratios within the range of from about 5:95 to about 25:75 may also be used.

It has been shown that a non-woven mat comprising about 10 percent glass fiber and about 90 percent bi-component fiber with a 50:50 PE sheath to PET core ratio does not require a binder, as the PE of the outer sheath melts in the curing oven and bonds the glass, and polymer fibers together. The embodiments of the non-woven mats disclosed herein and comprising about 10 percent glass fiber and about 90 percent bi-component fiber were cured in an oven having a temperature of about 350 degrees F. It will be understood that if desired, a coupling agent or bond promoter may be applied to the fibers within the non-woven mat to enhance bond strength between the glass, and polymer fibers.

To determine bond strength, five shingles were tested after the reinforcement material; i.e., the non-woven and woven mats, were sealed to the shingles per ASTM 6381. The shingles tested included: (1) control shingles formed with the woven reinforcement material 19, as described above; (2) shingles with a non-woven mats having bi-component fiber with a 50:50 PE sheath to PET core ratio and a basis weight of about 0.85 lbs/csf; (3) shingles with a non-woven mats having bi-component fiber with a 50:50 PE sheath to PET core ratio and a basis weight of about 1.0 lbs/csf; (4) shingles with non-woven mats having bi-component fiber with a 25:75 PE sheath to PET core ratio and a basis weight of about 0.85 lbs/csf; and (4) shingles with non-woven mats having bi-component fiber with a 25:75 PE sheath to PET core ratio and a basis weight of about 1.0 lbs/csf. The tests were conducted at three different temperatures: 72 degrees F., 40 degrees F., and 0 degrees F. As used herein, the temperatures at which the tests were conducted are referred to as pulling temperatures.

At a pulling temperature of about 72 degrees F., both the shingles with the non-woven mats having bi-component fiber with a 50:50 PE sheath to PET core ratio and basis weights of about 0.85 lbs/csf and about 1.0 lbs/csf, and the shingles with woven mats achieved or were very close to the desired bond strength of about 25 lbs. The shingles with the non-woven mats having bi-component fiber with a 25:75 PE sheath to PET core ratio and a basis weights of about 0.85 lbs/csf and 1.0 lbs/csf did not achieve the desired bond strength of about 25 lbs.

At a pulling temperature of 40 degrees F., both the shingles with the non-woven mats having bi-component fiber with a 50:50 PE sheath to PET core ratio and basis weights of about 0.85 lbs/csf and about 1.0 lbs/csf, and the shingles with woven mats achieved or were very close to the desired bond strength of about 15 lbs. The shingles with non-woven mats having bi-component fiber with a 25:75 PE sheath to PET core ratio and a basis weights of about 0.85 lbs/csf and about 1.0 lbs/csf did not achieve the desired bond strength of about 15 lbs.

At a pulling temperature of 0 degrees F., both the shingles with the non-woven mats having bi-component fiber with a 50:50 PE sheath to PET core ratio and basis weights of about 0.85 lbs/csf and about 1.0 lbs/csf, and the shingles with woven mats exceeded the desired bond strength of about 8 lbs. Advantageously, the 50:50 ratio mats with the basis weight of about 0.85 lbs/csf had a higher bond strength than the 50:50 ratio mats with the basis weight of about 1.0 lbs/csf. The shingles with non-woven mats having bi-component fiber with a 25:75 PE sheath to PET core ratio and a basis weights of about 0.85 lbs/csf and about 1.0 lbs/csf did not achieve the desired bond strength of about 8 lbs.

Over a range of temperatures including 0 degrees F., 40 degrees F., and 72 degrees F., the shingles with the non-woven mats having bi-component fiber with a 50:50 PE sheath to PET core ratio had a higher bond strength than the shingles with non-woven mats having bi-component fiber with a 25:75 PE sheath to PET core ratio at both the 0.85 lbs/csf and the 1.0 lbs/csf basis weights. It is believed that the increased bond strength is due to increased bonding of the fibers in the non-woven mat with the larger percentage (50 percent in the examples discussed above) of PE outer sheath.

It will be understood that non-woven mats having sheath to core ratios other than 50:50 may also meet or exceed the desired bond strengths over a range of temperatures. For example, non-woven mats having sheath to core ratios within the range of from about 40:60 to about 60:40 may meet or exceed the desired bond strengths over a range of temperatures. It will be further understood that these non-woven mats may have a basis weight within the range of from about 0.5 lbs/csf to about 1.5 lbs/csf.

Advantageously, a non-woven mat having bi-component fiber as described above is sufficiently strong and will not de-laminate when installed on a roof. The non-woven mat having bi-component fiber also forms a very strong bond with both the filled-asphalt of the shingle and the tab sealant. Further, the filled-asphalt of the shingle will not bleed through the embodiment of the non-woven mat described above.

In the exemplary shingle 74 illustrated in FIG. 2, the shingle 74 may have a nail pull-through value, measured in accordance with a desired standard, such as prescribed by ASTM test standard D3462. For example, the shingle 74 may have a nail pull-through value that is greater than in an otherwise identical shingle without the reinforcement material 19.

Improved nail pull-through resistance values have been demonstrated using a modified version of the nail pull-through test prescribed by ASTM test standard D3462, wherein the test fixture has an opening that has been reduced from a 2.5 inch diameter to a 1.5 inch diameter. Using this modified test at a temperature of 72 degrees F., a shingle 74 having reinforcement material 19 formed from woven polyester fabric may have a nail pull-through resistance value within the range of from about 39 percent to about 46 percent greater than in an otherwise identical shingle without the reinforcement material 19.

When using the modified test at a temperature of 32 degrees F., a shingle 74 having reinforcement material 19 formed from woven polyester fabric may have a nail pull-through resistance value of at least about 25 percent greater than in an otherwise identical shingle without the reinforcement material 19. Alternatively, when using the modified test at a temperature of 32 degrees F., a shingle 74 having reinforcement material 19 formed from woven polyester fabric may have a nail pull-through resistance value within the range of from about 25 percent to about 37 percent greater than in an otherwise identical shingle without the reinforcement material 19.

Improved nail blow through values have been demonstrated in shingles 74 relative to otherwise identical shingles without the reinforcement material 19. To test nail blow through, a shingle 74 was placed on oriented strand board and a nail was driven into the shingle 74 using an air gun at 130 psi to simulate installation on the roof, and to replicate any nail blow through damage that may occur to the shingle 74 during installation with an air gun at 130 psi. The test was conducted at room temperature or at about 72 degrees F. After the nail was driven into the shingle 74, the shingle 74 was turned upside down, the nail was driven back out of the shingle 74, and any wood present was removed from the shingle 74 and nail hole. A second nail was inserted in the hole formed by the first nail and the shingle 74 was tested for nail pull through resistance using the modified test described above. Using this method, a shingle 74 having reinforcement material 19 formed from woven polyester fabric may have a nail pull-through resistance value within the range of from about 13 percent to about 42 percent greater than in an otherwise identical shingle without the reinforcement material 19.

Because there may be substantially no granules in the portion of the overlay sheet 68 covered by reinforcement material 19, the weight of the laminated shingle 74 may be reduced relative to an otherwise identical shingle without the reinforcement material 19. For example, weight of the exemplary laminated shingle 74 illustrated in FIG. 2, may be reduced within the range of from about four percent to about six percent relative to the weight of an otherwise identical shingle having no such reinforcement material 19. The material and transportation costs may also be reduced.

As described above and shown in FIG. 1, the continuous strip of reinforcement material 19 may then be payed out from a roll 20 and adhered to the first asphalt coated sheet 18. As described above, the embodiment of the woven reinforcement material 19 illustrated in FIGS. 2 and 3 may have a thickness of about 9.5 mils. Alternatively, the reinforcement material 19 may be a woven material having a thickness within the range of from about 3 mils to about 20 mils, and may be too thick to be manufactured and mounted on a roll in the manner of known PET film.

For example, at typical roofing shingle line speeds, it is necessary for the reinforcement material to be within the range of from about 20,000 feet to about 30,000 feet long to maintain splicing intervals of within the range of from about 15 minutes to about 30 minutes. Films of about 1.5 mils in thickness are typically produced on master rolls several feet wide and then slit to a desired width, such as within the range of from about 1.0 inch to about 1.5 inches. These slit rolls of film are considered dimensionally stable and easy to handle.

The embodiment of the woven reinforcement material 19 illustrated in FIGS. 2 and 3 may have a thickness of about 9.5 mils. The woven reinforcement material 19 has compressive and tensile moduli significantly lower than PET film. Therefore, a 1.0 inch wide roll of the woven reinforcement material 19 slit from a wide roll in the manner of PET film is not dimensionally stable and is difficult to handle. Also, to ensure that splicing intervals at a desired level, such as within the range of from about 15 minutes to about 30 minutes, the outside diameter (OD) of a 1.0 inch wide roll of woven reinforcement material 19 would be significantly larger than a 1.0 inch wide roll of PET film due to the increased thickness of the woven reinforcement material 19.

Figure 7:
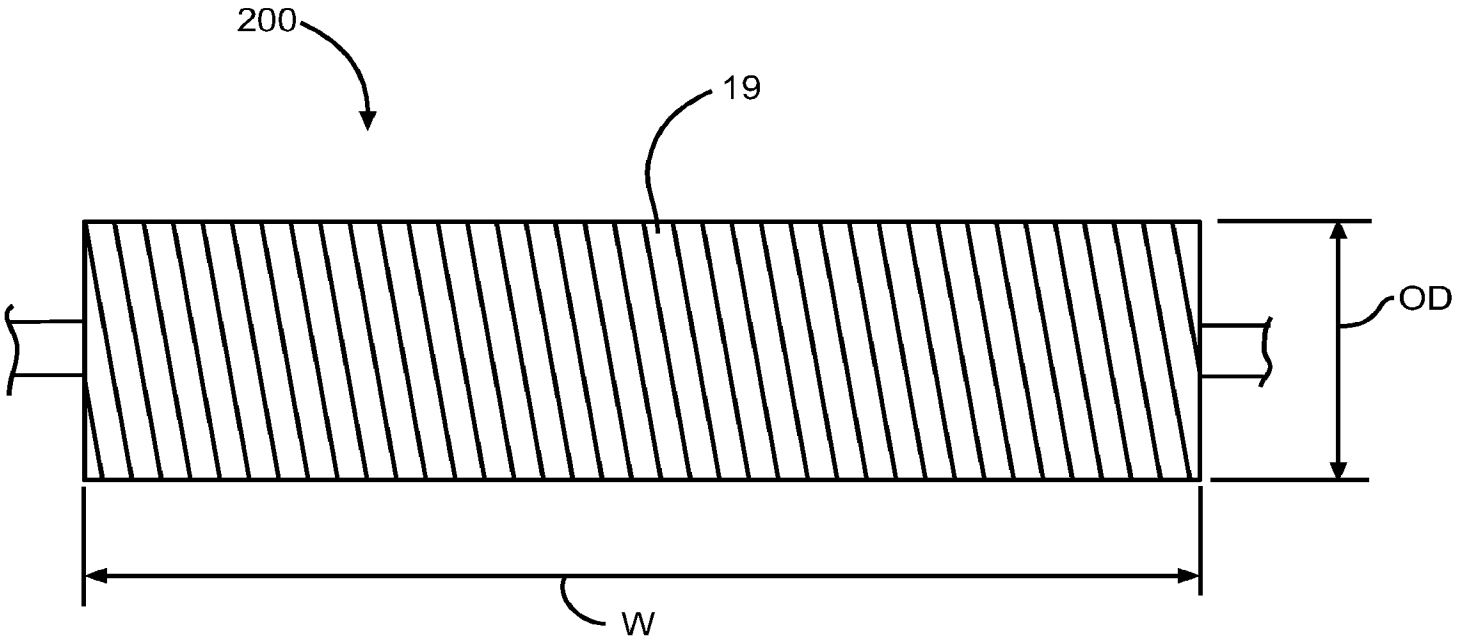
FIG. 7 is schematic elevational view of a spool of reinforcement material in accordance with the invention.

It has been shown that a length of woven reinforcement material 19 long enough to ensure that splicing intervals are within the range of from about 15 minutes to about 30 minutes may be provided on a spool or bobbin onto which the woven reinforcement material 19 has been applied or wound in a waywind pattern. In a first embodiment, as shown in FIG. 7, the spool 200 with the woven reinforcement material 19 installed may have a width W of about 10.0 inches. The woven reinforcement material 19 may be wound onto the spool 200 with about 20 wraps across the 10.0 inch width of the spool 19, such that the wound reinforcement material 19 has an outer diameter of about 19.0 inches. Once wound, the initial weight, i.e., the weight of the woven reinforcement material 19 before the spool 200 is used in a shingle manufacturing process, is about 35 lbs. In other embodiments, the spool 200 may hold within the range of from about 30 lbs. to about 40 lbs. of the woven reinforcement material 19. The spool may have any other desired width W, such as a width greater of at least about 10 inches. The spool may also hold any other desired amount of the woven reinforcement material 19, such as an amount greater than about 30 lbs. Additionally, the reinforcement material 19 may be wound onto the spool 200 such that the wound reinforcement material 19 has an outer diameter of at least about 19.0 inches.

Alternatively, the spool 200 with the woven reinforcement material 19 installed may have a width W of about 12.0 inches. The woven reinforcement material 19 may be wound onto the spool 200 with about 24 wraps across the 12.0 inch width of the spool 19, such that the wound reinforcement material 19 has an outer diameter of about 22.0 inches. The spool 200 will hold about 70 lbs of the woven reinforcement material 19. In other embodiments, the spool 200 may hold within the range of from about 65 lbs. to about 75 lbs. of the woven reinforcement material 19. Advantageously, with about 70 lbs. of the woven reinforcement material 19 on the spool 200, the spool 200 will run within the range of from about 45 minutes to about 60 minutes at a speed within the range of from about 600 ft/min to about 1000 ft/min before running out of woven reinforcement material 19 and needing to be changed. It will be understood that the length of time that the spool 200 will run before running out of woven reinforcement material 19 will vary with the thickness of the reinforcement material 19. It will be further understood that material, such as the woven reinforcement material 19, that has been applied to a spool in a waywind pattern may be unwound with little or no tangling.

It will be further understood that typical finishing operations performed on woven reinforcement material 19 during its manufacture adds undesirable cost to the woven reinforcement material 19. These finishing operations may consist of scouring the fabric to remove chemical processing agents. For polyester reinforcement material as described above, the polyester fabric may be heat-set when manufactured to reduce shrinkage when the polyester reinforcement material is applied to the hot asphalt of the first asphalt coated sheet 18. If desired, the reinforcement material 19 may be manufactured without these finishing operations. The reinforcement material 19 that has not been scoured or heat-set may then be slit to a width wider than the width desired on the finished laminated shingle 74 such that it shrinks to the desired width when applied to the hot asphalt of the first asphalt coated sheet 18.

For example, to achieve a second or installed width of about 1.0 inch on the finished laminated shingle 74, the reinforcement material 19 may be slit to a first or pre-installed width within the range of from about 1.125 inches to about 1.25 inches. It will be understood that the amount of shrinkage of the reinforcement material during application to the hot asphalt of an asphalt coated sheet will vary with the material of the reinforcement material 19, the temperature of the asphalt, and other factors.

If desired, processing chemicals such as lubricants may be applied to the reinforcement material 19 prior to its application to the hot asphalt of the first asphalt coated sheet 18. For example, a long chain saturated hydrocarbon lubricant with surface active functionality that is compatible with asphalt may aid in wetting out the fibers within the reinforcement material 19 by reducing the viscosity of the asphalt at the interface of the reinforcement material 19 and the asphalt during application of the reinforcement material 19. Examples of suitable lubricants include tallow amines, the reaction products of fatty acids with an excess of polyamines, and imidazalines derived from fatty acids.

Although the invention has been disclosed in the context of a laminated shingle 74, it will be understood that the reinforcement material 19 may be attached to any other type of shingle, such as a single layer shingle.

The present invention should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A method of manufacturing a roofing shingle comprising:

applying an asphalt coating to a substrate to define an asphalt coated sheet, the asphalt coated sheet including a headlap portion and a tab portion;

applying reinforcement material [from a spool] to the asphalt coated sheet, wherein the reinforcement material is [wound in a waywind pattern on the spool] *payed out from a roll*; and securing the reinforcement material to the headlap portion of the asphalt coated sheet;

wherein *prior to applying the reinforcement material to the asphalt coated sheet,* the reinforcement material [on the spool] has a first width, the method further including shrinking the reinforcement material to a second width narrower than the first width upon securing the reinforcement material to the headlap portion.

2. The method according to claim 1, wherein the reinforcement material is formed from woven material.

3. The method according to claim 1, wherein *the roll comprises a spool, wherein* the spool has a width of at least about 10.0 inches and the wound reinforcement material has an outer diameter of at least about 19.0 inches.

4. The method according to claim 3, wherein an initial weight of the reinforcement material on the spool is greater than about 30 lbs.

5. The method according to claim 1, wherein the reinforcement material has a thickness within the range of from about 3 mils to about 20 mils.

6. The method according to claim 1, wherein the reinforcement material has a thickness within the range of from about 5 mils to about 15 mils.

7. The method according to claim 1, wherein the reinforcement material has a thickness of about 9.5 mils.

8. The method according to claim 1, wherein the first width is within the range of from about 1.125 inches and about 1.25 inches.

9. The method according to claim 1, wherein the second width is about 1.0 inches.

10. A method of manufacturing a roofing shingle comprising:

applying an asphalt coating to a substrate to define an overlay sheet including a headlap portion and a tab portion;

securing an underlay sheet to the overlay sheet such that a region of the underlay sheet overlaps a region of the headlap portion of the overlay sheet;

applying reinforcement material [from a spool] to the overlay sheet, wherein the reinforcement material is [wound in a waywind pattern on the spool] *payed out from a roll*; and securing *the* reinforcement material to the headlap portion of the overlay sheet;

wherein *prior to applying the reinforcement material to the overlay sheet,* the reinforcement material [on the spool] has a first width, the method further including shrinking the reinforcement material to a second width narrower than the first width upon securing the reinforcement material to the headlap portion.

11. The method according to claim 10, wherein the reinforcement material is formed from woven material.

12. The method according to claim 10, wherein *the roll comprises a spool, wherein* the reinforcement material initially on the spool has a weight within the range of from about 30 lbs, to about 40 lbs.

13. The method according to claim 10, wherein *the roll comprises a spool, wherein* the reinforcement material initially on the spool has a weight within the range of from about 65 lbs, to about 75 lbs.

14. The method according to claim 10, wherein the reinforcement material has a thickness within the range of from about 3 mils to about 20 mils.

15. The method according to claim 10, wherein the first width is within the range of from about 1.125 inches and about 1.25 inches.

16. The method according to claim 10, wherein the second width is about 1.0 inches.

17. A method of manufacturing a roofing shingle comprising:

applying an asphalt coating to a substrate to define an asphalt coated sheet, the asphalt coated sheet including a headlap portion and a tab portion;

applying reinforcement material [from a spool] to the asphalt coated sheet, wherein the reinforcement material is [wound in a waywind pattern on the spool] *payed out from a roll*; and securing the reinforcement material to the headlap portion of the asphalt coated sheet *by pushing the reinforcement material into an asphalt coating of the asphalt coated sheet*, wherein *prior to applying the reinforcement material to the overlay sheet,* the reinforcement material [on the spool] has a first width, the method further including shrinking the reinforcement material to a second width narrower than the first width upon securing the reinforcement material to the headlap portion.

18. The method according to claim 17, wherein the reinforcement material is formed from woven material.

19. The method according to claim 18, wherein the first width is within the range of from about 1.125 inches and about 1.25 inches.

20. The method according to claim 18, wherein the second width is about 1.0 inches.

*21. The method according to claim 1, wherein applying the reinforcement material to the asphalt coated sheet comprises applying the reinforcement material to an upper surface of the asphalt coated sheet.*

*22. The method according to claim 1, wherein applying the reinforcement material to the asphalt coated sheet comprises applying the reinforcement material to a lower surface of the asphalt coated sheet.*

*23. The method according to claim 10, wherein applying the reinforcement material to the asphalt coated sheet comprises applying the reinforcement material to an upper surface of the asphalt coated sheet.*

*24. The method according to claim 10, wherein applying the reinforcement material to the asphalt coated sheet comprises applying the reinforcement material to a lower surface of the asphalt coated sheet.*

*25. The method according to claim 17, wherein applying the reinforcement material to the asphalt coated sheet comprises applying the reinforcement material to an upper surface of the asphalt coated sheet.*

*26. The method according to claim 17, wherein applying the reinforcement material to the asphalt coated sheet comprises applying the reinforcement material to a lower surface of the asphalt coated sheet.*

* * * * *